May 10, 1927.
F. P. WHITAKER
1,628,379
AUTOMATIC CONTROL SYSTEM
Filed June 9, 1925
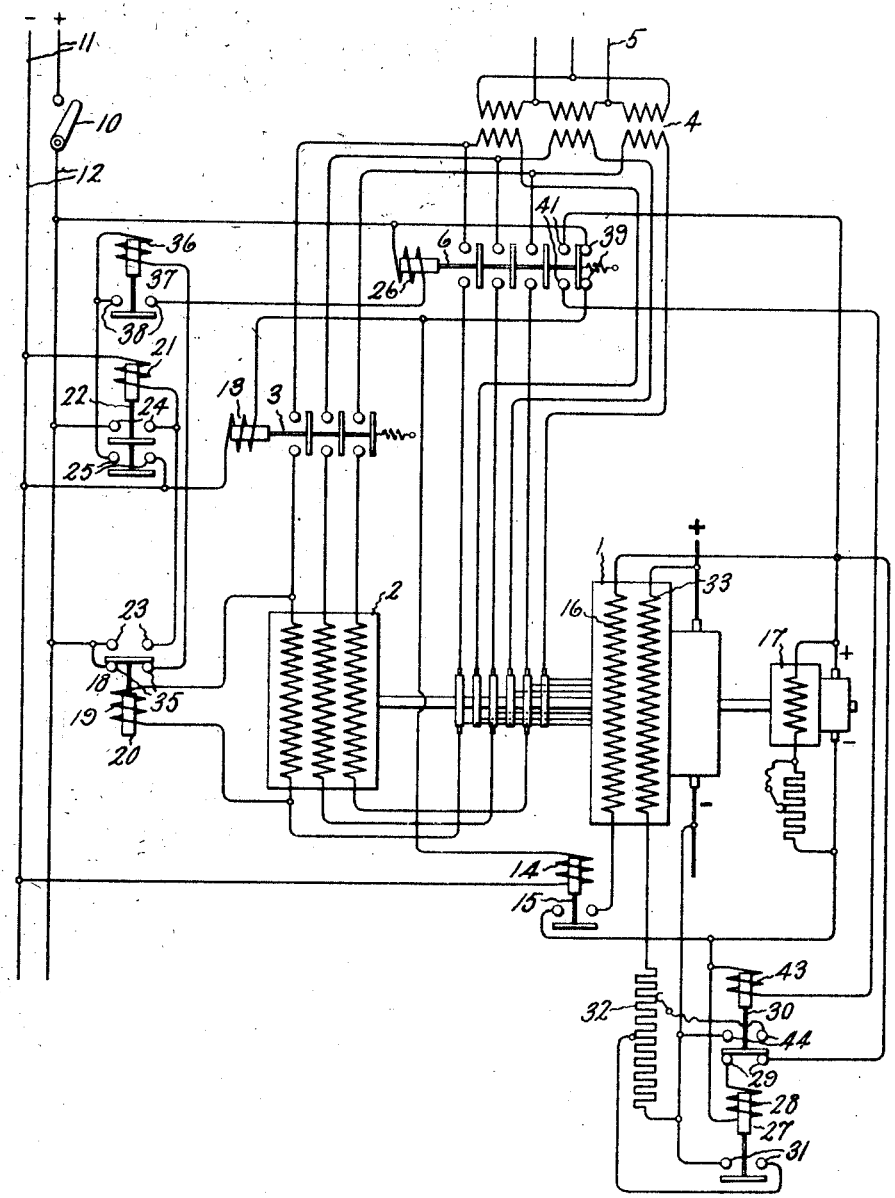
Inventor:
Frank P. Whitaker,
by Alexander S. Lunt
His Attorney.

Patented May 10, 1927.

1,628,379

UNITED STATES PATENT OFFICE.

FRANK P. WHITAKER, OF RUGBY, ENGLAND, ASSIGNOR TO GENERAL ELECTRIC COMPANY, A CORPORATION OF NEW YORK.

AUTOMATIC CONTROL SYSTEM.

Application filed June 9, 1925, Serial No. 36,046, and in Great Britain June 14, 1924.

My invention relates to systems for automatically controlling dynamo machines and more particularly to control systems for starting and obtaining the correct polarity at the direct current terminals of a motor-started, self-synchronizing rotary converter, and the object of my invention is to provide an improved arrangement for accomplishing this result.

In accordance with my invention means are provided for connecting the starting motor and the converter in series across the supply circuit during the starting operation and after it has reached synchronous speed the converter is connected directly to the supply circuit. Also, improved means are provided for automatically fixing the polarity of a synchronous converter as it comes up to synchronous speed during the starting operation thereof. Also, in accordance with my invention, means are provided whereby the shunt field current of the rotary converter may be automatically regulated to enable the rotary to pull into synchronism and to give normal voltage at the direct current terminals.

My invention will be better understood from the following description taken in connection with the accompanying drawing and its scope will be pointed out in the appended claims.

In the drawing, 1 is a rotary converter which is mechanically connected to a starting motor 2 in any suitable manner so that the converter may be started by closing the starting contactor 3 which connects the primary windings of the starting motor 2 and the armature winding of the converter 1 in series across the secondary terminals of transformer 4 which is supplied from a suitable alternating current supply circuit 5. After the correct polarity has been established, the contactor 3 is opened and the contactor 6 is closed to connect the armature winding of the converter directly to the secondary terminals of the transformer 4.

The automatic switching equipment for effecting the desired connections comprises a control switch 10 which, when closed, connects a suitable source of control current 11 to a control circuit 12. On closing this switch 10 the coils 13 and 14 of the starting contactor 3 and an auxiliary field contactor 15 respectively are energized and these contactors close their contacts.

Starting contactor 3, in closing, connects the primary winding of the starting motor 2, which may be of any suitable type, and the armature winding of the converter in series across the secondary windings of the main power transformers 4. Preferably the motor 2 is a relatively small induction motor whose primary winding has a relatively high impedance compared with the impedance of the converter armature winding, so that the starting current and the voltage impressed on the armature winding of the converter are relatively small.

Auxiliary field contactor 15, in closing, connects the auxiliary field winding 16 of the rotary 1 to the auxiliary generator 17 driven from the rotary shaft. A synchronous speed-indicating relay 18, the coil 19 of which is connected across one winding of the starting motor 2, lifts its plunger 20 and closes contacts 23 as soon as contactor 3 closes since substantially full voltage is impressed upon the starting motor windings at the instant of starting. The closing of the contacts 23 completes the circuit for the coil 21 of auxiliary contactor 22 across the control circuit 12.

Auxiliary contactor 22 closes and by means of contacts 24 completes a holding circuit for itself which is independent of the contacts 23 of relay 18. Also by means of contacts 25 it prepares the circuit of the coil 26 of running contactor 6.

The starting motor 2 rotates and brings the rotary 1 up to synchronous speed. As the auxiliary generator 17, driven from the rotary shaft, builds up its voltage it excites the auxiliary field winding 16 of the rotary converter. This auxiliary generator 17 may be of any suitable type which has a definite polarity, so that the direct current voltage of the converter always will have the correct polarity. When the direct current voltage of the generator 17 reaches a predetermined per cent of its normal value the synchronizing field contactor 27 whose coil 28 is connected directly across the armature of the auxiliary generator 17 through a normally closed interlock 29 on the full field contactor 30, closes its contacts 31.

The closing of the contacts 31 of contactor 27 varies the amount of resistance of the rheostat 32 or other suitable current limiting-means connected in series with the main field 33 of the rotary converter to give the correct field current for synchronizing. The rotary converter 1 now pulls into synchronism and this is indicated by the drop in voltage across the starting motor windings. When this drop is a minimum the synchronous speed-indicating relay 18 opens its contacts 23 and closes its contacts 35 thereby completing the circuit of the coil 36 of auxiliary contactor 37 across the control circuit 12.

Contactor 37 then closes its contacts 38 and completes the circuit of the coil 26 of the running contactor 6 across the control circuit 12.

The running contactor 6 on closing its main contacts connects the rotary converter direct to the power transformers, thereby short-circuiting the contacts of the starting contactor 3 and the primary windings of the starting motor 2.

The opening of normally closed interlocks 39 when contactor 6 is closed, deenergizes the starting contactor 3 and auxiliary field contactor 15, thus disconnecting the starting motor 2 from the main transformers 4 and the auxiliary field 16 from the auxiliary generator 17.

By means of normally open contacts 41 on contactor 6 the circuit of the coil 43 of the full field contactor 30 is completed when the contactor 6 is closed.

Contactor 30 on closing its contacts 44 adjusts the resistance 32 connected in series with the main field 33 of the rotary converter 1 to give the correct field current and normal voltage at the direct current terminals of the rotary converter.

A normally closed interlock 29 on contactor 30 interrupts the circuit of the coil 28 of the synchronous field contactor 27 which opens its contacts 30 and removes the short circuit across the synchronizing tap of the main field rheostat 32.

While I have, in accordance with the patent statutes, shown and described my invention as applied to a particular system and as embodying various devices diagrammatically indicated, changes and modifications will be obvious to those skilled in the art and I therefore aim in the appended claims to cover all such changes and modifications as fall within the true spirit and scope of my invention.

What I claim as new and desire to secure by Letters Patent of the United States, is:—

1. In combination, a supply circuit, a dynamo electric machine, a starting motor for said machine mechanically connected thereto, means for connecting said motor and machine in series across said supply circuit to start said machine, and means responsive to the voltage drop across said starting motor for effecting the connection of said machine directly to said supply circuit.

2. In combination, an alternating current supply circuit, a synchronous dynamo electric machine, an alternating current starting motor mechanically connected to said machine, switching means for connecting said machine and motor in series across said supply circuit to start said machine, and means responsive to the voltage drop across said starting motor during the starting operation for effecting the connection of said machine directly to said supply circuit.

3. In combination, an alternating current supply circuit, a synchronous dynamo electric machine, an alternating current starting motor mechanically connected to said machine, switching means for connecting said machine and motor in series across said supply circuit to start said machine, a relay responsive to the voltage drop across said starting motor, and means controlled by said relay for effecting the connection of said machine directly to said supply circuit when the voltage impressed on said relay decreases below a predetermined value after having previously increased above a predetermined value.

4. In combination, an alternating current supply circuit, a synchronous dynamo electric machine, an alternating current starting motor mechanically connected to said machine, switching means for connecting said machine and motor in series across said supply circuit to start said machine, a relay responsive to the voltage drop across said starting motor, a control relay arranged to be energized in response to the operation of said first-mentioned relay when the voltage impressed thereon exceeds a predetermined value, a second control relay arranged to be energized in response to the operation of said first-mentioned relay when the voltage impressed thereon decreases below a predetermined value after said first-mentioned control relay has been energized, and switching means for connecting said machine directly to said supply circuit controlled by said second control relay.

5. In combination, an alternating current supply circuit, a shunt excited synchronous converter, a starting motor for said converter, switching means for electrically connecting said motor and converter in series across said supply circuit, a source of excitation, other switching means for connecting said source to a field winding of said converter, means arranged when operated to effect the operation of both of said switching means to connect said motor and converter in series across said supply circuit and to connect said source to said field winding of said converter to separately excite said converter, and means operative when said converter reaches a predetermined speed to effect the connection of said converter directly to said supply circuit and the disconnection of said source from said field winding of said converter.

6. An arrangement for establishing the correct polarity of a synchronous converter during the starting operation thereof comprising a shunt field winding, a current-limiting means for limiting the current in said shunt field winding, means operative in accordance with the speed of said converter for controlling said current limiting means so as to increase the shunt excitation when the speed of the converter reaches a predetermined value, a separately excited field winding, a source of current having a definite polarity, and switching means for connecting said source to said separately excited field winding during the starting operation of said converter.

7. An arrangement for establishing the correct polarity of a synchronous converter during the starting operation thereof comprising a shunt field winding, current-limiting means for limiting the current in said shunt field winding, a direct current generator arranged to be driven at a speed proportional to the speed of the converter, means responsive to the voltage of said generator for controlling said current-limiting means so as to increase the shunt excitation when the speed of the converter reaches a predetermined value, another field winding for said converter, and switching means for connecting said last-mentioned field winding to said generator during the starting operation of said converter.

8. An arrangement for establishing the correct polarity of a synchronous converter during the starting operation thereof comprising a shunt field winding, current-limiting means for limiting the current in said shunt field winding, another field winding for said converter, a source of current having a definite polarity, switching means for connecting said last-mentioned field winding to said source during the starting operation of said converter, and means operative when the starting operation has been completed for controlling said current-limiting means so as to increase the excitation of said shunt field winding and for disconnecting said source from the other field winding.

9. In combination, a synchronous converter having a shunt field winding and a separately excited field winding, a source of alternating current, switching means for connecting said converter to said source to effect the starting of said converter, a source of current having a definite polarity for supplying said separately excited field winding during the starting operation of said converter, current-limiting means connected in circuit with said shunt field winding during the starting operation of said converter, and means for disconnecting said separately excited field winding from said source of current and for decreasing the amount of current-limiting means in the circuit of said shunt field winding after the starting operation has been completed.

10. An arrangement for starting and establishing the correct polarity of a synchronous converter during the starting operation thereof comprising means for impressing a relatively low voltage on said converter during the starting operation thereof, means for impressing a relatively high voltage on said converter when it has been brought up to a predetermined speed, a shunt field winding for said converter excited during the starting operation, a source of current having a definite polarity, another field winding for said converter adapted to be energized by said source during the starting operation, and means for disconnecting said last-mentioned field winding from said source after said relatively high voltage has been impressed on said converter.

11. An arrangement for starting and establishing the correct polarity of a synchronous converter during the starting operation thereof comprising a starting motor for said converter, a supply circuit, means for connecting said converter directly to said supply circuit when said converter reaches a predetermined condition during the starting operation, a shunt field winding for said converter, current-limiting means in the circuit of said shunt field winding, a direct current generator driven by said converter, another field winding for said converter, switching means for connecting said last-mentioned field winding to said generator during the starting operation, means responsive to a predetermined voltage of said generator for decreasing the amount of current-limiting means in the circuit of the shunt field winding, and means operative after said converter has been connected directly to said supply circuit to disconnect said last-mentioned field winding from said generator and to decrease the amount of current-limiting means in the circuit of the shunt field winding.

In witness whereof, I have hereto set my hand this 22nd day of May, 1925.

FRANK P. WHITAKER.